(12) United States Patent
Carratt et al.

(10) Patent No.: US 8,831,860 B2
(45) Date of Patent: Sep. 9, 2014

(54) METHOD AND A SYSTEM FOR MONITORING VIBRATORY PHENOMENA THAT OCCUR IN AN AVIATION GAS TURBINE ENGINE IN OPERATION

(75) Inventors: Bruno Carratt, Vincennes (FR); David Flores, Mennecy (FR); Edouard Jadczak, Le Mee sur Seine (FR)

(73) Assignee: SNECMA, Paris (FR)

( * ) Notice: Subject to any disclaimer, the term of this patent is extended or adjusted under 35 U.S.C. 154(b) by 230 days.

(21) Appl. No.: 13/144,358

(22) PCT Filed: Jan. 12, 2010

(86) PCT No.: PCT/FR2010/050038
§ 371 (c)(1),
(2), (4) Date: Jul. 13, 2011

(87) PCT Pub. No.: WO2010/081983
PCT Pub. Date: Jul. 22, 2010

(65) Prior Publication Data
US 2011/0276247 A1 Nov. 10, 2011

(30) Foreign Application Priority Data

Jan. 13, 2009 (FR) ..................................... 09 50156

(51) Int. Cl.
*G06F 19/00* (2011.01)
*G06G 7/70* (2006.01)
*F02C 9/28* (2006.01)
*G01M 15/14* (2006.01)
*G01H 1/00* (2006.01)
*G01M 13/02* (2006.01)
*G01M 15/12* (2006.01)

(52) U.S. Cl.
CPC ................ *F02C 9/28* (2013.01); *F05D 2260/96* (2013.01); *G01M 15/14* (2013.01); *G01H 1/00* (2013.01); *G01M 13/028* (2013.01); *F05D 2270/114* (2013.01); *G01M 15/12* (2013.01); *F05D 2270/708* (2013.01)
USPC ......................................................... 701/111

(58) Field of Classification Search
CPC .. F02C 9/28; F05D 2260/96; F05D 2270/708
USPC .................................................. 701/100, 111
See application file for complete search history.

(56) References Cited

U.S. PATENT DOCUMENTS 4,010,637 A * 3/1977 Harwell et al. ................. 73/658
6,019,310 A 2/2000 Maino et al.
(Continued)

FOREIGN PATENT DOCUMENTS

EP 1 970 691 9/2008

OTHER PUBLICATIONS

International Search Report issued May 7, 2010 in PCT/FR10/50038 filed Jan. 12, 2010.

*Primary Examiner* — Behrang Badii
*Assistant Examiner* — Daniel L Greene
(74) *Attorney, Agent, or Firm* — Oblon, Spivak, McClelland, Maier & Neustadt, L.L.P.

(57) ABSTRACT

A method of monitoring vibratory phenomena that occur in an aviation gas turbine engine in operation includes establishing a frequency spectrum of a vibratory signal representative of the operating state of the engine and of its components; using a plurality of vibratory signatures, each corresponding to a vibratory phenomenon that occurs during operation of aeroengines of the same type as the engine being monitored and originating from a defect in or an abnormal operation of a component of the engines; identifying, in the spectrum, the points of curves that match mathematical functions, each defining a vibratory signature; and for each identified curve corresponding to a defect of engine components, analyzing the amplitude associated with the points of the curve relative to predefined amplitude values corresponding to a degree of severity of the defect; and as a result of an amplitude value being exceeded or an abnormal operation being detected, issuing a message associated with the vibratory signature.

11 Claims, 2 Drawing Sheets

(56) References Cited

U.S. PATENT DOCUMENTS

| | | | |
|---|---|---|---|
| 6,116,089 A | 9/2000 | El-Ibiary et al. | |
| 6,301,572 B1 * | 10/2001 | Harrison | 706/52 |
| 7,222,002 B2 * | 5/2007 | Maine | 701/3 |
| 2004/0060347 A1 | 4/2004 | Comperat et al. | |
| 2007/0250245 A1 | 10/2007 | Van Der Merwe et al. | |
| 2008/0223135 A1 | 9/2008 | Blanchard et al. | |
| 2009/0306839 A1 * | 12/2009 | Youngquist et al. | 701/14 |

* cited by examiner

METHOD AND A SYSTEM FOR MONITORING VIBRATORY PHENOMENA THAT OCCUR IN AN AVIATION GAS TURBINE ENGINE IN OPERATION

BACKGROUND OF THE INVENTION

The present invention relates to the general field of monitoring gas turbine engines of aircrafts, such as airplanes or helicopters, for example. The invention relates more particularly to a method and a system for monitoring vibratory phenomena that occur in an aircraft gas turbine engine while it is in operation.

It is known to place accelerometer type vibration sensors in an aircraft engine in order to detect the vibration emitted by one or more particular components of the engine while the engine is in operation. The collected vibratory signal is analyzed in order to compare its amplitude with defined threshold values, each corresponding to operation with a defect of a particular monitored component. Thus, in the event of a defect in a monitored component of the engine, its operation causes a particular vibratory phenomenon to appear, which phenomenon may be detected by analyzing the vibratory signal.

Document EP 1 970 691 describes such a method applied to monitoring the wear of the rolling elements of an intershaft bearing in an aviation turbomachine. In that invention, the vibratory signal that is picked up is transformed into a frequency spectrum in order to obtain spectrum lines that are ordered in multiples of the theoretical frequency generated by damage to a rolling element of a bearing (the theoretical frequency of damage corresponding to operating the rolling element with a defect). The amplitude peaks identified around multiples of that theoretical frequency are then compared with predefined threshold values in order to determine whether the rolling elements of the bearing are damaged.

Although effective, that type of prior art monitoring method nevertheless presents certain limits as to its application. It is very complicated or even impossible to calculate the theoretical operating frequency with defects for all of the components of an engine. And even if that is possible for some components, such calculation remains a simulation and is therefore of reliability that is not always guaranteed. As a result, numerous vibratory phenomena occur in the engine during a flight of the aircraft that originate from an engine component defect but that are not detected or that are poorly interpreted, thereby running the risk of the corresponding consequences in terms of potential damage to the engine.

Furthermore, prior art monitoring methods do not make it possible to detect abnormal operation of a component of the engine, such as for example slip of a rolling element of a bearing in the raceways of the bearing. Unfortunately, such abnormal operation, which is not necessarily associated with structural defects of the components of the engine, can give rise to damage to those components.

OBJECT AND SUMMARY OF THE INVENTION

A main object of the present invention is thus to mitigate such drawbacks by proposing a method and a system enabling the monitoring of an aircraft gas turbine engine to be improved.

In accordance with the invention, this object is achieved by a monitoring method consisting in:

a) during a predefined period of operation of the engine, acquiring a vibratory signal representative of the operating state of the engine and of its components;

b) over the predefined period, establishing a frequency spectrum of the vibratory signal;

c) using a plurality of vibratory signatures, each corresponding to a vibratory phenomenon occurring during the operation of aeroengines of the same type as that being monitored and originating from a defect in or abnormal operation of at least one of the components of the engines, each vibratory signature being defined by a particular mathematical function having coefficients that are predetermined as a function of operating parameters of the engine;

d) in the frequency spectrum, identifying points of curves that fit mathematical functions, each defining a vibratory signature, in order to detect the presence of defects in and abnormal operation of components of the engine;

e) for each curve identified in the frequency spectrum and corresponding to a vibratory signature originating from a defect in components of the engine, analyzing the amplitude associated with the points of the curve relative to predefined amplitude values, each corresponding to a degree of severity of the defect; and f) as a result of one or more amplitude values being exceeded or of abnormal operation of a component of the engine being detected, issuing a message associated with the vibratory signature for which the amplitude value(s) has/have been exceeded or for which the abnormal operation has been detected.

Having recourse to particular mathematical functions for defining vibratory signatures makes it possible to cover all of the vibratory phenomena that occur in the engine and that originate from a defect in or abnormal operation of a component of the engine, regardless of whether the phenomena are organized or not, or are theoretically predictable or not. As a result, all defects in and abnormal operation of components of the engine that give rise to particular vibratory phenomena in flight can be monitored. This makes it possible to improve monitoring of the engine.

According to an advantageous provision of the invention, the method further consists in generating a maintenance notice for the engine when the same message has been emitted repeatedly over a plurality of flights, over a plurality of identical flight stages, or over a plurality of periods of the engine operating at the same speed. This provision makes it possible to track variation in the particular vibratory phenomenon over time and to prevent damage to the engine by issuing a maintenance notice before damages occurs. This greatly improves maintenance operations and the potential for repairing the component in question from which the particular vibratory signature originates.

The maintenance notice preferably includes the identity of the engine component(s) at the origin of the abnormal vibratory phenomenon for which the message was issued.

According to another advantageous provision of the invention, the mathematical functions defining the vibratory signatures are stored in a database that is capable of being updated. The use of such a database makes it possible, where necessary, to update the coefficients of the mathematical functions associated with the vibratory signatures, and to add new functions. In particular, this updating operation may be performed directly after a flight by making a connection to the database. Thus, the method presents great flexibility in use and of adaptation.

The analysis of the amplitude associated with the points in a given curve identified in the frequency spectrum may consist in comparing the amplitude associated with each point of the curve with at least one predefined threshold value, or in comparing the mean value of the amplitudes associated with points of the curve with a predefined mean threshold value, or by calculating a standard deviation between the amplitudes associated with the points of the curve and predefined threshold values.

The coefficients of the particular mathematical functions defining the vibratory signatures are also predetermined as a function of flight parameters of the aircraft and/or the shapes of the engine components.

The predefined period of engine operation during which the vibratory signal is acquired may correspond to a particular stage of flight, a complete flight, or the engine operating at a particular speed.

The defects in and the abnormal operation of engine components giving rise to vibratory phenomena may belong to the following list: flutter of the engine fan; a defect of a bearing supporting at least one rotary shaft of the engine in rotation; the appearance of an oil unbalance on one of the rotors of the engine; mechanical damage to a geartooth; slip of a rolling element of a bearing; a crack or wear of a component.

Correspondingly, the invention also provides a system for monitoring vibratory phenomena occurring in an aircraft gas turbine engine in operation, the system being characterized in that it comprises:

a) means for operating during a predefined operating period of the engine to acquire a vibratory signal representative of the operating state of the engine and of its components;

b) means for acting over the predefined period to establish a frequency spectrum of the vibratory signal;

c) a database comprising a plurality of vibratory signatures, each corresponding to a vibratory phenomenon occurring during operation of aircraft engines of the same type as the engine being monitored and originating from a defect in or abnormal operation of at least one of the components of the engines, each vibratory signature being defined by a particular mathematical function having coefficients that are predetermined as a function of operating parameters of the engine;

d) means for identifying, in the frequency spectrum, points of curves that match mathematical functions, each defining a vibratory signature, in order to detect the presence of defects in and abnormal operation of components of the engine;

e) means for analyzing the amplitude associated with the points of the curves as identified in this way relative to predefined amplitude values, each corresponding to a degree of severity of a defect in the or each component of the engine associated with the vibratory signature; and f) means for issuing a message associated with the vibratory signature for which the amplitude value(s) have/had been exceeded or for which abnormal operation has been detected as a result of one or more amplitude values being exceeded or as a result of abnormal operation of an engine component being detected.

BRIEF DESCRIPTION OF THE DRAWINGS

Other characteristics and advantages of the present invention appear from the following description given with reference to the accompanying drawings that show an implementation having no limiting character. In the figures.

DETAILED DESCRIPTION OF AN IMPLEMENTATION

The monitoring method and system of the invention apply to any type of gas turbine engine fitted to aircraft, such as airplanes or helicopters, for example.

In the presently-described example, attention is given more particularly to an airplane gas turbine engine that has two rotors. Naturally, the invention is not limited to a two-rotor engine but applies to any aircraft gas turbine engine having one or more rotors.

The monitoring method and system of the invention serves automatically to identify particular vibratory phenomena that occur in the engine in operation and that originate from a defect in or abnormal operation of a component in the engine (including ancillary equipment). The monitored defects comprise for example wear of a rolling element of a bearing, flutter of the fan (in a turbomachine), etc. As for abnormal operation of a component of the engine, this may involve, for example, a rolling element of a bearing sliding in its raceways.

The monitoring method and system of the invention rely on analyzing vibratory signals coming from vibration sensors (of the accelerometer type) that are typically installed in an engine. In known manner, such vibration sensors are connected for signal processing to an engine monitoring unit (EMU) that may be present in the airplane (e.g. in an electronics bay) or that may be fitted directly to the engine.

Figure 1:
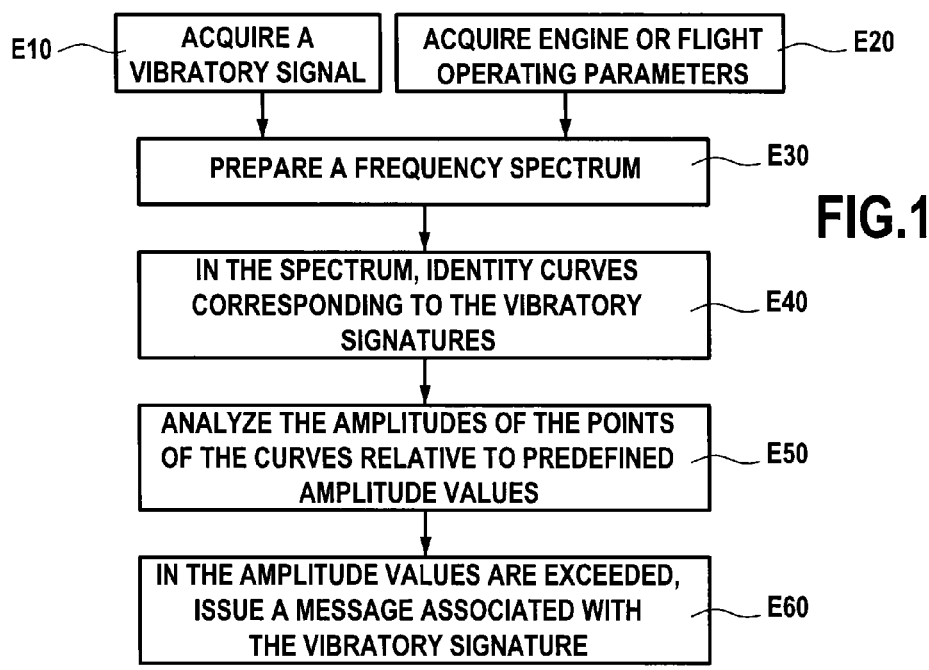
FIG. 1 is a flow chart showing the various steps of the monitoring method of the invention.

With reference to FIG. 1, the monitoring method of the invention consists initially in acquiring a vibratory signal $S_v$ during a predefined measurement period T during the operation of the engine, which signal is representative of the operating state of the engine and of its components (i.e. of the vibration levels of the components of said engine—step E10) and of operating parameters of the engine or flight parameters (step E20).

In the presently-described example, the parameters acquired during step E20 are the speeds of rotation N1 and N2 of the two rotors of the engine. Nevertheless, they could be other operating parameters of the engine (such as oil temperature, for example) or indeed flight parameters (such as, for example: flying speed and altitude, temperature outside the aircraft, etc.).

The measurement period T during which the vibratory signal $S_v$ and the parameters are acquired may correspond to a particular stage of flight of an airplane (such as for example takeoff or landing), or to a complete flight of the airplane, or indeed to the engine operating under particular conditions (e.g. at full throttle or while cruising). Monitoring may therefore be performed continuously as soon as the engine is in operation.

As mentioned above, the vibratory signal $S_v$ comes from an accelerometer installed in the engine. The signal is transmitted to the EMU and stored in a memory thereof for analysis, either while the airplane is in flight or else after it has landed.

When step E20 consists in acquiring speeds of rotation N1 and N2 of the rotors of the engine, this is performed synchronously with the vibratory signal $S_v$, and may for example consist in converting the signals coming from tachometer probes mounted on the rotors of the engine (such probes may already be present on the engine). These signals are also forwarded to the EMU and are stored in a memory thereof.

The following step (E30) consists in establishing a frequency spectrum (or spectrogram) for the vibratory signal $S_v$ over the period T. In known manner, the frequency spectrum is generally established as a function of the speeds of rotation N1 and N2 of the rotors of the engine, or else as a function of time.

Figure 2:
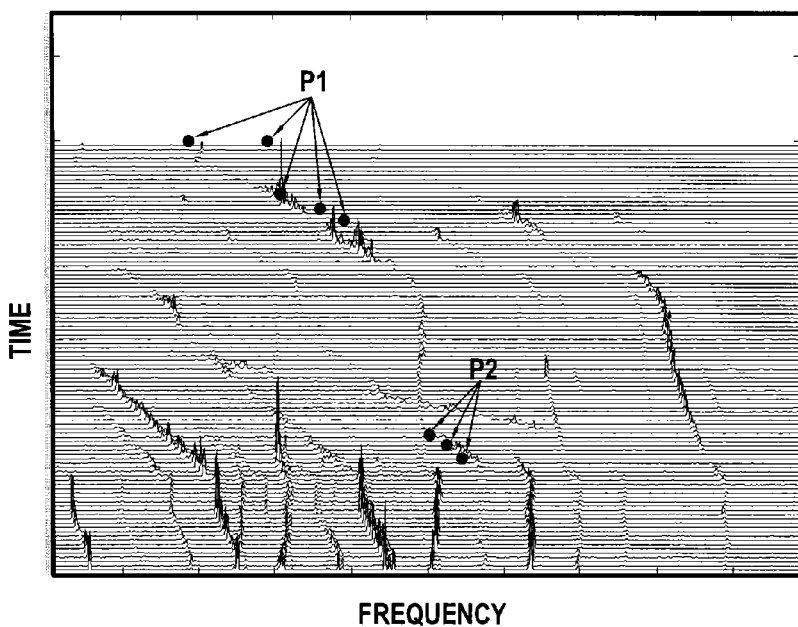
FIG. 2 shows a frequency spectrum obtained in a step of the monitoring method of the invention.

Furthermore, the frequency spectrum is established by applying a Fourier transform and serves to obtain a three-dimensional chart (time or speed of rotation/frequency/amplitude). FIG. 2 shows an example of a frequency spectrum obtained for an airplane gas turbine engine having two rotors, with frequency plotted along the abscissa axis and time up the ordinate axis.

Step E30 of establishing a frequency spectrum is itself well known to the person skilled in the art and is therefore not described in detail herein. It is performed by means of calculation software of the EMU.

During a step E40, the monitoring method of the invention makes provision for identifying points in the frequency spectrum that belong to curves that correspond to previously-defined vibratory signatures.

Each of these vibratory signatures corresponds to a particular vibratory phenomenon occurring during the operation of engines of the same type as the engines being monitored and originating from a fault or from abnormal operation of at least one of the components of the engine.

Each vibratory signature is also defined by a particular mathematical function F having coefficients that have previously been determined, in particular as a function of operating parameters of the engine (speeds of rotation of the rotors, oil temperature, etc.), and optionally as a parameter of flight parameters of the aircraft (speed, altitude, outside temperature, etc.).

The mathematical functions F defining the vibratory signatures may thus be in the form of polynomial functions, exponential functions, logarithmic functions, etc. By way of example, one particular mathematical function may be in the form of a predetermined polynomial combination of the speeds of rotation of the rotors of the engine.

The method of obtaining the vibratory signatures, and in particular the coefficients of the corresponding mathematical functions F, is described in detail below.

Step E40 is performed by means of calculation software of the EMU. Using calculation methods that are well known to the person skilled in the art, this step consists in identifying, in the frequency spectrum, various points that belong to curves defined by the above-described particular mathematical functions and that are associated with the vibratory signatures, said points having as their coordinates: frequency; time; and/or the speeds of rotation of the rotors, depending on which frequency spectrum model that is established.

In the example frequency spectrum shown in FIG. 2, the points P1 all belong to a curve of shape that is defined by a predetermined particular mathematical function. As for the points P2, they all belong to another curve of shape that is defined by another predetermined particular mathematical function.

Thus, this step E40 serves to detect whether, during the measurement period T, one or more components of the engine present a defect or are operating in abnormal (or degraded) manner.

Naturally, the frequency range of the spectrum in which points are identified that belong to curves defined by particular mathematical functions may itself be subjected to adjustments by means of appropriate settings. A point having coordinates that differ in frequency very little (i.e. by no more than a predetermined value) from a curve defined by a particular mathematical function may thus be considered as belonging to said curve.

Furthermore, it is possible to associate each curve that is defined by a particular mathematical function with a frequency range in which points of the frequency spectrum belonging to said curve are to be identified.

In the event of a curve being detected in the frequency spectrum that corresponds to a vibratory signature originating from a defect of an engine component, a following step (E50) consists in analyzing the amplitude associated with the points of such curves relative to predefined amplitude values. Each of these amplitude values corresponds to a degree of severity of the defects in question.

This analysis step is likewise performed by means of software of the EMU. It may be implemented using various calculation methods that are well known to the person skilled in the art: the amplitude associated with each point of the curve may be compared with at least one predefined threshold value; or the mean value of the amplitude associated with the points of the curve may be compared with a predefined mean threshold value; or indeed a standard deviation calculation may be performed between the amplitudes associated with the points of the curve and predefined threshold values.

In the event of one or more amplitude values being exceeded, a message is issued (step E60), which message is associated with the vibratory signature for which the amplitude value(s) has/have been exceeded.

This step E60 also makes provision for emitting a message as a result of abnormal operation of a component of the engine being detected during step E40, this message also being associated with the vibratory signature for which the abnormal operation has been detected.

When the monitoring method is implemented in flight, this message may be stored in a memory of the EMU for subsequent analysis, or it may be transmitted directly to the ground by transmission means that are themselves known.

Furthermore, it is advantageous to store in memory the messages that are issued during a given flight so as to make it possible optionally to generate an engine maintenance notice subsequently. Such a maintenance notice is generated in particular in application of a diagnosis rule specific to the engine and in the event of a given message being emitted repeatedly over a plurality of flight, over a plurality of identical stages of flights, or over a plurality of periods when the engine is operating at the same speed.

Thus, it is possible to track variation of a particular vibratory phenomenon over time and to forestall any damage to the engine component(s) from which the vibratory phenomenon originates by issuing a maintenance notice in advance. For this purpose, the maintenance notice naturally includes the identity of the engine component(s) at the origin of the vibratory phenomenon for which the message is issued. This tracking of the mechanical health of the engine component(s) makes it possible to predict a remaining length of time for which the engine can operate before a maintenance action needs to be performed.

Figure 3:
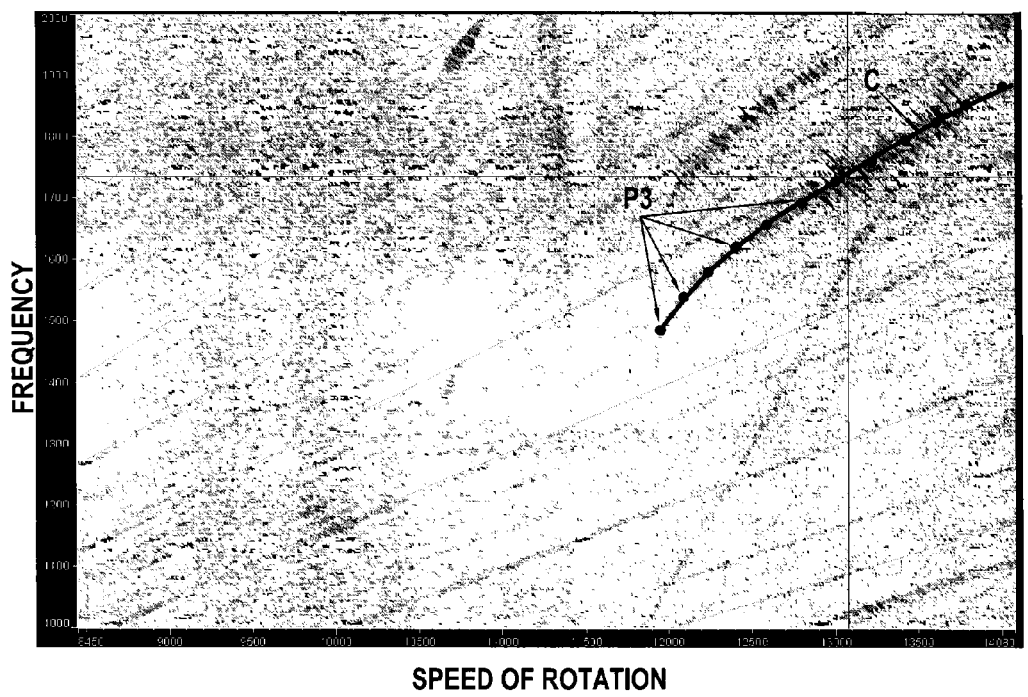
FIG. 3 shows another frequency spectrum obtained in a step of the monitoring method of the invention.

Example Applied to Identifying a Defect in a Turbomachine Rolling Element of a Bearing With reference to FIG. 3, there follows a description of an implementation of the method of the invention as applied to monitoring a rolling element of a bearing. In this example, the engine is a bypass two-spool aviation turbomachine of the CMF56® type and the bearing being monitored is the upstream bearing of the high pressure rotor of the turbomachine.

The frequency spectrum shown in FIG. 3 corresponds to speed of rotation plotted along the abscissa axis against frequency plotted up the ordinate axis for a vibratory signal picked up by an accelerometer mounted on a stationary portion of the turbomachine. The speeds of rotation N1 and N2 are the speeds of rotation of the low pressure spool and of the high pressure spool respectively of the turbomachine.

The frequency spectrum was established over a period corresponding to engine operation going from idling to full throttle.

Two vibratory signatures are used in this example. One of these vibratory signatures corresponds to a defect of a rolling element of a bearing, and the other vibratory signature corresponds to abnormal operation of the same rolling element of a bearing.

The vibratory signature corresponding to abnormal operation of a rolling element of a bearing is defined by the following polynomial combination F:

$$F=-0.0001N_2^2+3.3071N_2-22507$$

and it is represented in FIG. 3 by the curve C.

The vibratory signature corresponding to a defect of the rolling element of a bearing is defined for normal operation by the following linear function F':

$$F'=9.5N_2$$

Naturally, a defect may occur simultaneously with abnormal operation, for example spalling of the rolling element may be combined with slip. Such spalling may be initiated by the abnormal operation.

Using digital calculation that takes account of all of the points of the frequency spectrum (speed of rotation plotted along the abscissa axis, frequency plotted up the ordinate axis), the points P3 in the spectrum are identified as belonging (to within a given approximation) to the curve C corresponding to the vibratory signature defined by the polynomial combination F.

The result of the mathematical function represented by the curve C makes it possible to interrogate the spectrum in the predefined frequency range in order to recover the amplitude of the vibration signal and the associated information.

Recovering and storing all of these results over the engine speed or time range associated with the frequency range are followed by a step of comparing amplitudes with predefined threshold values.

Method of Obtaining Vibratory Signatures

There follows a description of how the vibratory signatures are obtained, and more particularly how the various coefficients of the particular mathematical functions corresponding to said signatures are established.

The vibratory signatures are established for a given family of aeroengines, i.e. for engines having the same main characteristics. Concerning the example frequency spectrum shown in FIG. 3, the family of turbomachines is the CFM56® family.

The vibratory signatures are also determined as a function of the shapes of the components of the engines forming part of this family. For example, when monitoring a defect of a rolling element in a turbomachine bearing, the vibratory signature associated with the defect depends in particular on the shape of the rolling element, the number of rolling elements, and the speed of rotation of the shafts supported by the bearing.

Furthermore, with the help of the shapes of the components, various methods can be used to determine the coefficients of the particular mathematical functions that correspond to said vibratory signatures.

When applicable, one of these methods consists in calculating the coefficients of a particular mathematical function by performing a theoretical calculation. For example, when monitoring a defect in a rolling element of an inter-shaft roller bearing in a turbomachine, it is known that the theoretical polynomial combination corresponding to operation with a defect of a rolling element in the bearing may be written as follows:

$$F=[D(/(2d)]\times(N_2-N_1)\times[1-(d/D)^2]$$

where D is the nominal diameter of the bearing, d is the diameter of a roller, and $N_1$ and $N_2$ are the respective speeds of rotation of the shafts supported by the bearing.

Another method that may be used for calculating the variables of a particular mathematical function relies on experience based on feedback from events in service or tests during development. This comprises using vibratory data collected by the vibration sensors of the engine when a defect of a component of the invention has been identified. In particular, this method generally needs to begin from a theoretical calculation corresponding to operation with a defect or to abnormal operation of a component of the engine, with this calculation then being refined by making use of feedback from experience, and with this mathematical function possibly being combined with some other phenomenon such as slip of the rolling element, for example.

In application to an aviation turbomachine, these particular mathematical functions may for example correspond to the following defects and kinds of abnormal operation of the turbomachine: flutter of the turbomachine fan; a defect in a bearing supporting at least one rotary shaft of the turbomachine in rotation; appearance of an oil unbalance on one of the rotors of the turbomachine; mechanical degradation of a gear tooth; slip of a rolling element of a bearing; cracking in or wear of a component; etc.

Once all of mathematical functions have been identified, they are associated with the defect or the abnormal operation of the component of the aircraft from which the particular vibratory phenomenon originates. They are then stored in the form of a configuration table in a database of a memory of the EMU.

The advantage of having recourse to a database is that it can be updated. By "updating" the database in which the mathematical functions are stored, it should be understood that new mathematical functions associated with new vibratory signatures may be added to the configuration table, or that the table may be modified by adjusting the coefficients of mathematical functions that are already present or by adjusting the mathematical functions themselves.

Thus, other defects and other kinds of abnormal operation of engine components that occur while the engine is in operation and that give rise to respective particular vibratory phenomena can be identified subsequently, and the corresponding vibratory signatures can be added to the database. This possibility enables the database to be enriched by adding new vibratory signatures thereto as new defects and new kinds of abnormal operation are identified. Updating the database is also simple since it may be performed directly on board the aircraft by making a connection to the EMU.

Thus, the method of the invention presents great flexibility in use and in adaptation. It serves in particular to respond to a crisis in service by acting directly on the aircraft, e.g. without it being necessary to return the EMU to the factory for reconfiguration.

The invention claimed is:

1. A method of monitoring vibratory phenomena that occur in an aircraft gas turbine engine in operation, the method comprising:
   a) during a predefined period of operation of the engine, acquiring a vibratory signal representative of an operating state of the engine and of components of the engine;
   b) over the predefined period, establishing a frequency spectrum of the vibratory signal;
   c) providing a database including a plurality of preprogrammed vibratory signatures, each vibratory signal corresponding to a vibratory phenomenon occurring during the operation of aircraft engines of a same type as the engine being monitored and originating from a defect in or abnormal operation of at least one of the components of the engines, each vibratory signature being defined by a mathematical function of operating parameters of the engine, and coefficients of each mathematical function corresponding to one of the plurality of vibratory signatures being predetermined and preprogrammed in the database based on at least one of a theoretical calculation for or previous data acquired from an engine of the same type as the engine being monitored;

d) calculating, using a processor, curves corresponding to mathematical functions in the database that defines the plurality of preprogrammed vibratory signatures, and, in the frequency spectrum, identifying, using the processor, a set of points of the frequency spectrum that fits one of the calculated curves corresponding to one of the plurality of preprogrammed vibratory signatures, in order to detect at least one of a presence of a defect in or abnormal operation of the least one component of the engine;

e) for each curve identified using the processor that fits the set of points in the frequency spectrum corresponding to a preprogrammed vibratory signature in the database originating from a defect in the at least one component of the engine, analyzing, using the processor, an amplitude of the points of the curve relative to predefined amplitude values, each predefined amplitude value corresponding to a degree of severity of the defect in the at least one component of the engine associated with the vibratory signature; and f) as a result of at least one amplitude value being exceeded or of abnormal operation of the at least one component of the engine being detected, issuing a message associated with the vibratory signature for which the at least one amplitude value has been exceeded or for which the abnormal operation has been detected.

2. A method according to claim 1, further comprising generating a maintenance notice for the engine when the same message has been emitted repeatedly over a plurality of flights, over a plurality of identical flight stages, or over a plurality of periods of the engine operating at the same speed.

3. A method according to claim 2, wherein the maintenance notice includes the identity of the at least one engine component at an origin of the vibratory phenomenon for which the message was issued.

4. A method according to claim 1, wherein the database is capable of being updated.

5. A method according to claim 1, wherein the analysis of the amplitude associated with the points in the curve identified in the frequency spectrum includes comparing the amplitude associated with each point of the curve with at least one predefined threshold value, comparing the mean value of the amplitudes associated with points of the curve with a predefined mean threshold value, or calculating a standard deviation between the amplitudes associated with the points of the curve and predefined threshold values.

6. A method according to claim 1, wherein the coefficients of the particular mathematical functions defining the vibratory signatures are also predetermined as a function of at least one of flight parameters of the aircraft or the shapes of the engine components.

7. A method according to claim 1, wherein the predefined period of engine operation during which the vibratory signal is acquired corresponds to a particular stage of flight, a complete flight, or the engine operating at a particular speed.

8. A method according to claim 1, wherein the defects in and the abnormal operation of engine components giving rise to vibratory phenomena include: flutter of the engine fan; a defect of a bearing supporting at least one rotary shaft of the engine in rotation; the appearance of an oil unbalance on one of the rotors of the engine; mechanical damage to a geartooth; slip of a rolling element of a bearing; a crack or wear of a component.

9. A method according to claim 1, wherein the operating parameters of the engine include rotational speed of rotors and oil temperature.

10. A system for monitoring vibratory phenomena occurring in an aircraft gas turbine engine in operation, the system comprising:

a) means for operating during a predefined operating period of the engine to acquire a vibratory signal representative of an operating state of the engine and of components of the engine;

b) means for acting over the predefined period to establish a frequency spectrum of the vibratory signal;

c) a database comprising a plurality of preprogrammed vibratory signatures, each vibratory signal corresponding to a vibratory phenomenon occurring during operation of aircraft engines of a same type as the engine being monitored and originating from a defect in or abnormal operation of at least one of the components of the engines, each vibratory signature being defined by a mathematical function of operating parameters of the engine, and coefficients of each mathematical function corresponding to one of the plurality of vibratory signatures being predetermined and preprogrammed in the database based on at least one of a theoretical calculation for or previous data acquired from an engine of the same type as the engine being monitored;

d) means for calculating curves corresponding to mathematical functions in the database that defines the plurality of preprogrammed vibratory signatures, and means for identifying, in the frequency spectrum, a set of points of the frequency spectrum that fits one of the calculated curves corresponding to one of the plurality of preprogrammed vibratory signatures, in order to detect at least one of a presence of a defect in or abnormal operation of the at least one component of the engine;

e) means for analyzing an amplitude associated with the points of the curves as identified by the means for identifying relative to predefined amplitude values, each predefined amplitude value corresponding to a degree of severity of a defect in the at least one component of the engine associated with the vibratory signature; and f) means for issuing a message associated with the vibratory signature for which at least one amplitude value has been exceeded or for which abnormal operation has been detected as a result of the least one amplitude value being exceeded or as a result of abnormal operation of an engine component being detected.

11. A system according to claim 10, wherein the database in which the mathematical functions defining the vibratory signatures are stored is recorded in a memory of an electronic monitoring unit of the engine or of the aircraft and is capable of being updated.

* * * * *